(12) United States Patent
Yeung et al.

(10) Patent No.: US 8,769,338 B1
(45) Date of Patent: Jul. 1, 2014

(54) SAVING AND RESTORING STATES THROUGH LOW POWER MODE

(75) Inventors: Rudolph Yeung, Sunnyvale, CA (US); Patrick Chan, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 789 days.

(21) Appl. No.: 12/894,047

(22) Filed: Sep. 29, 2010

Related U.S. Application Data

(60) Provisional application No. 61/317,207, filed on Mar. 24, 2010.

(51) Int. Cl.
*G06F 11/00* (2006.01)

(52) U.S. Cl.
USPC .............. 714/22; 714/21; 714/10; 713/322; 713/323; 713/324

(58) Field of Classification Search
USPC ................ 714/21, 22, 10; 713/322, 323, 324
See application file for complete search history.

(56) References Cited

U.S. PATENT DOCUMENTS

| 5,386,552 | A | * | 1/1995 | Garney | 714/10 |
| 5,659,762 | A | * | 8/1997 | Sawada et al. | 713/323 |
| 5,790,536 | A | * | 8/1998 | Mahany et al. | 370/338 |
| 7,269,780 | B2 | * | 9/2007 | Arima et al. | 714/764 |
| 7,698,586 | B2 | * | 4/2010 | Kim et al. | 713/324 |
| 7,725,750 | B2 | * | 5/2010 | Ashish et al. | 713/323 |
| 2002/0162037 | A1 | * | 10/2002 | Woods et al. | 713/322 |
| 2003/0114206 | A1 | * | 6/2003 | Timothy et al. | 455/575 |
| 2004/0073818 | A1 | * | 4/2004 | Cheok et al. | 713/300 |
| 2005/0245292 | A1 | * | 11/2005 | Bennett et al. | 455/574 |
| 2007/0260794 | A1 | * | 11/2007 | Ashish et al. | 710/267 |

* cited by examiner

*Primary Examiner* — Joshua P Lottich
*Assistant Examiner* — Jeison C Arcos
(74) *Attorney, Agent, or Firm* — DeLizio Gilliam, PLLC

(57) ABSTRACT

An integrated circuit is disclosed including one or more communication devices, an operational controller configured by a state device in a normal mode for the communication device, which may consume more power than in a low power mode. The operational controller retains an operational state in a normal mode for the communication device that may be corrupted during low power mode. A save-restore processor operates a configuration bus and an essentially non-volatile memory at the start a low power mode to retain the operational state and end of the low power mode to restore the operational state.

18 Claims, 5 Drawing Sheets

SAVING AND RESTORING STATES THROUGH LOW POWER MODE

CROSS REFERENCE TO RELATED APPLICATION

This application claims the benefit of the priority date of the U.S. provisional patent application Ser. No. 61/317,207, entitled Method and Apparatus for Saving and Restoring States in an Integrated Circuit Through Low Power Mode, which is hereby incorporated by reference in its entirety.

TECHNICAL FIELD

This invention relates to integrated circuit apparatus and operations regarding entering and exiting a low power mode.

BACKGROUND OF THE INVENTION

Many devices, particularly handheld devices, are required to operate for long periods of time on battery power. To operate in this manner, such devices often support one or more lower power modes of operation, such as while waiting to receive a message or phone call. During such times, various parts of these devices may be put into a low power mode that reduces their power consumption. This is sometimes also called sleep mode.

One way to achieve the lowest sleep power is to shut down the power domain blocks which are not needed in a low power mode or sleep mode. For example, in a WiFi device, the Baseband and MAC blocks contribute up to 40-50% of the total digital leakage power. However, to be able to shut down Baseband and MAC, all the dynamic logic states and software configurations are required to be maintained. In another words, hardware states and configurations need to be saved before going to sleep and restored after completing the sleep mode. Two common methods to achieve this process are the usage of state-retention flip-flops or the usage of a complete software management of the operation. State-retention flip-flops are expensive to implement. It requires the implementation of dual power rails and increase in gate size. Alternatively, a complete software management of the operation is time consuming and requires considerable power consumption.

To develop an improved low power mode solution for digital systems, one needs to understand the properties of logic circuits. Logic circuits are frequently composed of logic cells that may store bits and/or operate on bits. The logic cells are often part of a library of cells that have been designed, not only electrically but also as layout templates, simulated, verified and tested for the specific semiconductor manufacturing process for the intended integrated circuit.

Examples of logic cells often found in cell libraries include, but are not limited to, logic gates and latches. Examples of logic gates include nand and nor gates. Logic latches tend to maintain an internal state that forms their output. Examples of latches include D flip-flops and R-S latches. Latches may not be able to maintain their internal state during low power mode, leading to the possibility of the internal state being corrupted. Logic gates during low power mode tend to continue to dissipate power in the form of leakage current. The amount of leakage current dissipated may vary for a logic gate for different inputs in low power mode.

Another set of logic circuits are known as Finite State Machines (FSM), which are typically configured to receive at least one input, maintain and update at least one state and generate at least one output based upon the value of at least one of the inputs and/or the value of at least one of the states. FSM may include instances of logic gates and/or latches. A processor comprises finite state machines. Hence, an integrated circuit with processor or computational elements also comprises finite state machines.

Many integrated circuits include FSM, which have internal states that are neither read nor written by any bus. Today, retaining the states of these FSM through low power mode often requires the use of state-retention flip-flops, which are expensive to implement and manufacture through their use of dual power rails and the increased size of these flip-flops.

Many integrated circuits require tables of dynamic state/configuration information to be retained through low power mode. Today such tables can only be retained through the use of a software based retention and restoration process that takes a comparatively long time, and as a consequence, consumes a lot of power.

What is needed is an apparatus for these integrated circuits that can retain and restore the states of FSM and/or tables of dynamic state/configuration information that is faster and more energy efficient than the software approach but without using the state-retention flip-flops.

SUMMARY OF THE INVENTION

Integrated circuits are disclosed including a communication device and an operational controller that at least partly controls the communication device in a normal mode using an operational state maintained by a state device. The communication device operating in normal mode often consumes much more power than in low power mode, but the operational state may be corrupted in the operational controller. A save-restore processor may operate a configuration bus and an essentially non-volatile memory, at the start of a low power mode to retain the operational state, and at the end of the low power mode to restore the operational state, which may be possibly lost during the low power mode. The essentially non-volatile memory may be implemented with a non-volatile memory and/or with a volatile memory supplied with electrical power to retain the operational state during the low power mode (together these are referred to as essentially non-volatile memory).

These integrated circuits have several advantages that result in decreased power consumption going into and coming out of low power mode, as well as reduced time to enter and exit low power mode.

The configuration bus may also configure the state devices upon turning on the integrated circuit. The integrated circuit may be initialized to act as a communication agent such as a client, host, access point and/or base station compliant with any of a number of communications protocols for wireless networks, cellular phones and/or BLUETOOTH®. Such initialization may at least in part configure the save-restore processor and may affect the operational states to save and restore at the start and the end of low power mode.

The save-restore processor, the configuration bus and the essentially non-volatile memory may also be used to reduce leakage current of the operational controller during low power mode using a low power mode value as the operational state. Determining the low power mode value that reduces the leakage current during low power mode is also disclosed.

DETAILED DESCRIPTION

The disclosed integrated circuits have several advantages that result in decreased power consumption going into and coming out of low power mode, as well as reduced time to enter and exit low power mode.

The integrated circuit may include a communication device and an operational controller that at least partly controls the communication device in a normal mode using an operational state maintained by a state device. The communication device operating in normal mode often consumes much more power than in low power mode, but the operational state may be corrupted in the operational controller. A save-restore processor may operate a configuration bus and an essentially non-volatile memory, at the start of a low power mode to retain the operational state, and at the end of the low power mode to restore the operational state, which may be lost during the low power mode.

Figure 1:
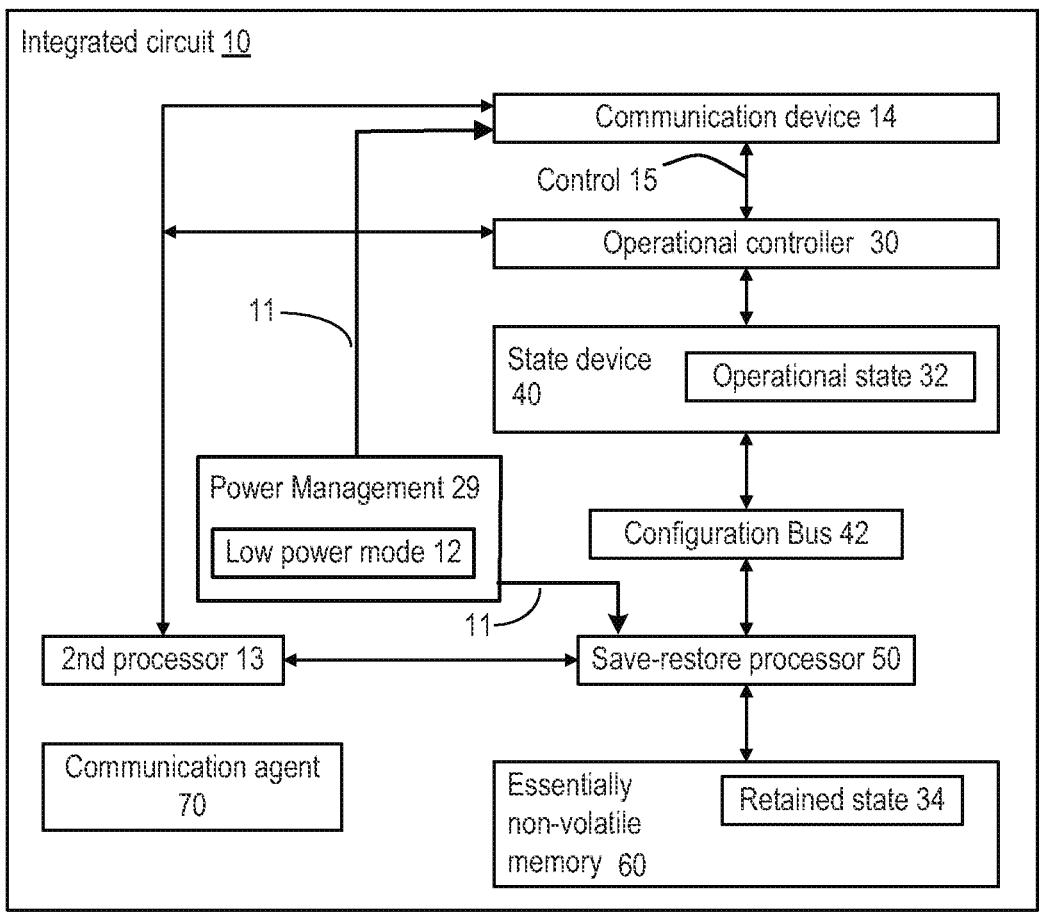
FIG. 1 shows an example of an embodiment of the integrated circuit built in accord with this disclosure.

Referring to the drawings more particularly by reference numbers, FIG. 1 shows an example of an integrated circuit 10 that may include a communication device 14 and an operational controller 30 that at least partly controls 15 the communication device 14 in a normal mode using an operational state 32 maintained by a state device 40. The communication device 14 operating in normal mode may be transmitting and/or receiving communications such that it often consumes much more power as compared to operating in the low power mode. The integrated circuit 10 further comprise an element, power management 29, that determines the timing of the low power mode 12. Power management 29 generates a low power mode signal 11. A save-restore processor 50 may operate a configuration bus 42 and an essentially non-volatile memory 60 at the start of a low power mode 12 to retain the operational state 32 and end of the low power mode 12 to restore the operational state 32, which may be lost during the low power mode 12. This retains the operational state 32 when the state device 40 may not have sufficient power to insure its copy of the operational state 32 is uncorrupted.

The save-restore processor 50 may retrieve the operational state 32 of the state device 40 and write operational state 32 to the essentially non-volatile memory 60 to create a retained state 34 at the start of the low power mode 12 in response to the low power mode signal 11 from power management 29. And the save-restore processor 50 may access the essentially non-volatile memory 60 to send the retained state 34 through the configuration bus 42 to the state device 40 to restore the operational controller 30 to the operational state 32 at the end of the low power mode 12. Note that in some embodiments, the integrate circuit 10 may support a no power mode as one of its low power modes 12.

A second processor 13 and/or the save-restore processor 50 may operate the integrated circuit 10 to configure it to act as a communication agent 70, possibly as a client, host, access point and/or base station compliant with one or more communications protocols, which may in turn act to configure the save-restore processor 50, possibly initialize one or more of the operational states 32 for one or more of the operational controllers 30 and/or configure which of the operational states 32 may need to be saved and restored.

By way of example, the normal mode may be indicated when the low power mode signal 11 is not asserted and the low power mode 12 in the integrated circuit 10 is indicated when the low power mode signal 11 is asserted. The start of low power mode 12 is indicated as the transition to asserting the low power mode signal 11 and the end of low power mode 12 is indicated as the transition to unasserting the low power mode signal 11. Note that assertion may make the low power mode signal '1' and in other embodiments, it may make it '0'.

These integrated circuits 10 have several advantages that add up to decreased power consumption going into and coming out of low power mode 12, as well as reduced time to enter and exit low power mode 12.

Figure 2:
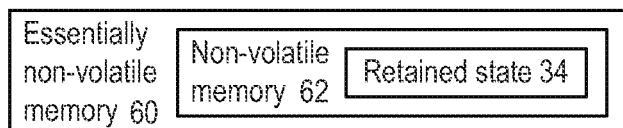
FIGS. 2 and 3 show examples of the essentially non-volatile memory of FIG. 1.
Figure 3:
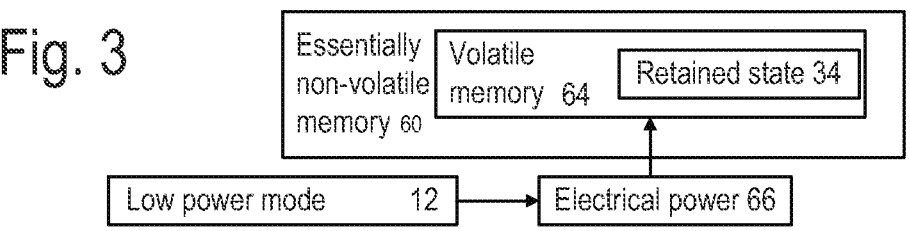

FIGS. 2 and 3 show examples of the essentially non-volatile memory 60 of FIG. 1. FIG. 2 shows an example of the essentially non-volatile memory 60 of FIG. 1 including at least one instance of a non-volatile memory 62 configured to retain the retained state 34 during low power mode. As used herein, a non-volatile memory retains its contents without requiring electrical power whereas a volatile memory is provided with electrical power frequently enough so that it has sufficient power to insure its copy of the operational state 32 is uncorrupted. In other words, the essentially non-volatile memory includes at least one instance of a volatile memory provided electrical power during the low power mode to retain the retained state during the low power mode FIG. 3 shows an example of the essentially non-volatile memory 60 including a volatile memory 64 provided electrical power 66 during the low power mode 12 to maintain the retained state 34 during low power mode 12.

Figure 4:
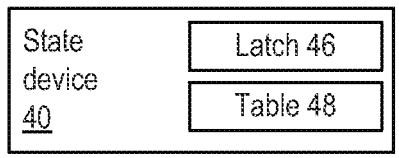
FIG. 4 shows an example of the state device of FIG. 1.

FIG. 4 shows an example of the state device 40 of FIG. 1 that may include at least one instance of a latch 46 and/or at least one instance of a table 48. The latch 46 may include any combination of a clocked flip-flop, a master-slave latch and/or an asynchronous latch such as a Reset-Set (RS) latch. The table 48 may include a Random Access Memory (RAM) and/or an array of latches accessed by an addressing scheme.

Figure 5:
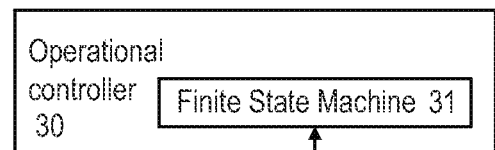
FIG. 5 shows an example of the operational controller of FIG. 1.
Figure 5:
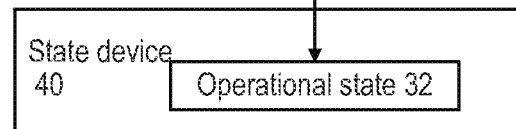

FIG. 5 shows an example of the operational controller 30 of FIG. 1 that may include at least one Finite State Machine 31 whose state is based upon the operational state 32 in normal mode.

As shown in FIGS. 1 and 3, the operational controller 30 may control 15 at least part of the communication device 14.

Figure 6:
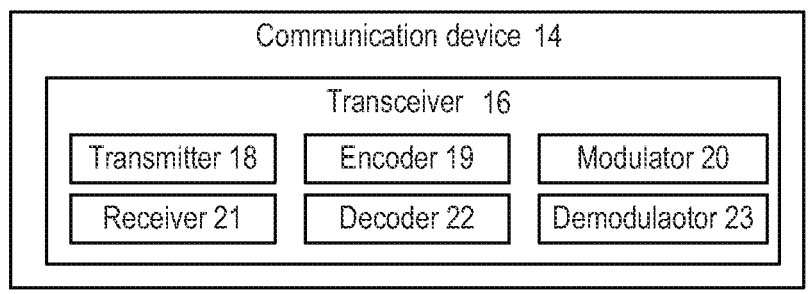
FIGS. 6 and 7 show examples of at least one of the communication devices of FIG. 1.
Figure 7:
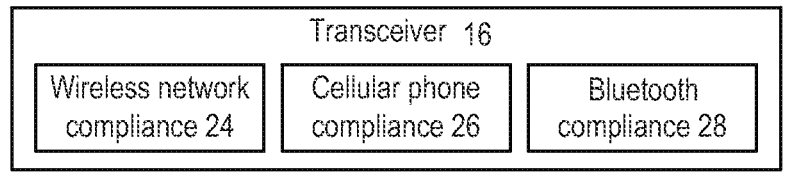

FIGS. 6 and 7 show examples of at least one of the communication devices 14. FIG. 6 shows at least one of the communication devices 14 may include at least part of at least one transceiver 16, as shown through the examples of, but not limited to, a transmitter 18, an encoder 19, a modulator 20, a receiver 21, a decoder 22 and/or a demodulator 23.

FIG. 7 shows that the transceiver 16 may include support a variety of wireless communication standards, for example, a wireless network compliance 24, a cellular phone compliance 26 and/or a Bluetooth compliance 28. The wireless network compliance 24 may include a form of an Institute for Electrical and Electronic Engineering (IEEE) 802.11 and/or IEEE 802.15 wireless communications protocol. The cellular phone compliance 26 may include a form of IS-95, GSM, a third and/or a fourth generation cellular phone protocol. The Bluetooth compliance 28 may include any form of standard set by the Bluetooth consortium. Note that compliance may affect the output frequency and frequency band, the modulation-demodulation mechanisms, as well as the packet and/or frame structures being parsed and composed by the communication device 14 and/or the transceiver 16. These items may be referred to as communication protocols. Hence, the communication device 14 implements at least part of a transceiver compliant with at least one member of the group consisting of a wireless network protocol, a cellular phone protocol and a Bluetooth protocol.

Note that the integrated circuit 10 may include more than one communication device 14 supporting low power mode 12 in a similar fashion. While only one communication device 14 is being shown and discussed in the FIGS. 1 and 12, this is done to simplify the disclosure and is not meant to limit the scope of the claims. By way of example, an integrated circuit 10 may include two communication devices 14, with the first including a transceiver 16 that is cellular phone compliant 26 and the second communication device 14 including a transceiver 16 that is Bluetooth compliant 28.

Figure 8:
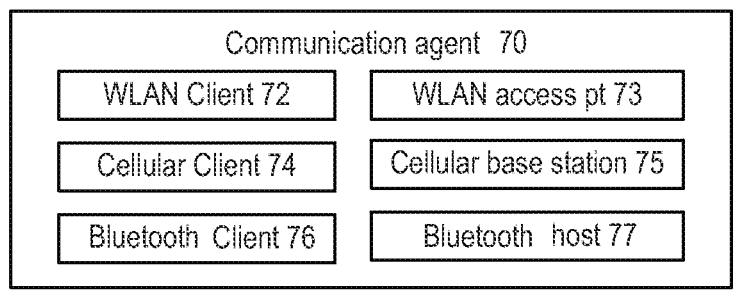
FIG. 8 shows some examples of the communication agent of FIG. 1.

FIG. 8 shows an example of communication agent 70 of FIG. 1, which may include but is not limited to the following: a Wireless Local Access Network (WLAN) client 72, a WLAN access point 73, a cellular client 74, a cellular base station 75, a Bluetooth client 76 and a Bluetooth host 77.

Figure 9:
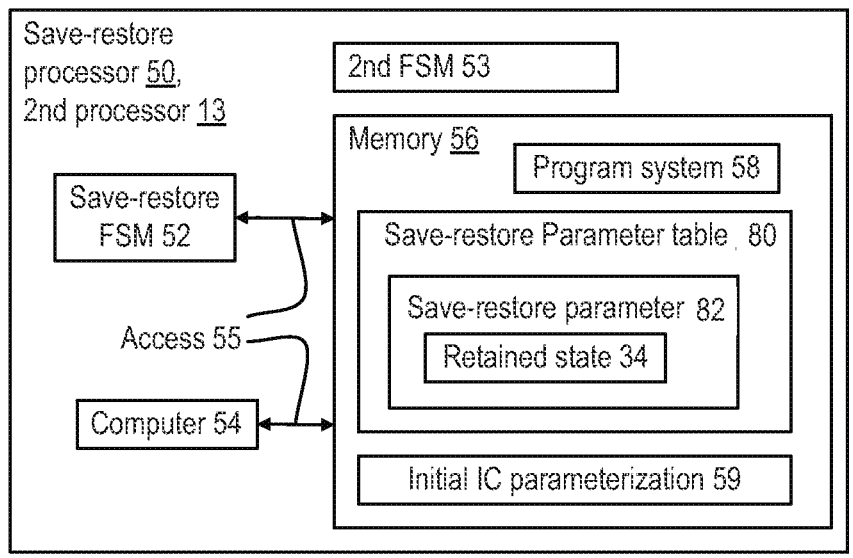
FIG. 9 shows some details of examples of the save-restore processor and/or the second processor of FIG. 1.

FIG. 9 shows some details of some embodiments of the save-restore processor 50 and/or the second processor 13 of FIG. 1. The save-restore processor 50 and/or the second processor 13 may include at least one instance of a save-restore Finite State Machine (FSM) 52, a second FSM 53, memory 56 and/or a computer 54.

The computer 54 may access 55 to at least one memory 56 that may include a program system 58 and/or a save-restore parameter table 80 that may include at least one save-restore parameter 82 for the retained state 34 of at least-one state device 40. The save-restore parameter table 80 may reside in a memory 56 that is accessed 55 by the save-restore FSM 52.

Note that the second processor 13 and the save-restore processor 50 may both include distinct instances of computers 54.

The memory 56 may also include an initial parameterization 59 of the integrated circuit 10 that may be used to configure the integrated circuit 10 as the communication agent 70. Examples of initial parameterization 59 may include operational states 32 that configure the communication device 14 to have cellular phone compliance 26 supporting a cellular client 74. Alternatively, the initial parameterization 59 may configure the communication device 14 as a WLAN access point 73.

As used herein, the computer 54 may include at least one instruction processor and at least one data processor, with each data processor directed by at least one of the instruction processors and with at least one of the instruction processors at least partly implementing the operations of the save-restore processor 50 and/or the second processor 13 as disclosed herein through the discussion that follows regarding the program system 58. These operations may be at least partly illustrated through flowcharts showing program steps that may reside in the memory 56, which may include volatile and/or non-volatile memory components, and may be considered computer readable memory.

Figure 10:
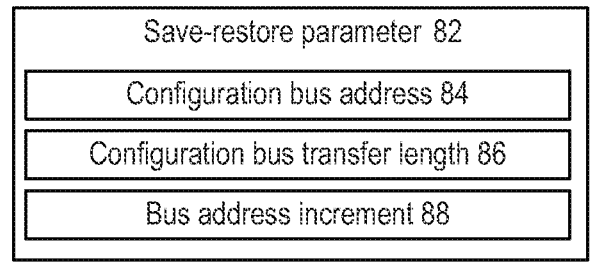
FIG. 10 shows some details of examples of the save-restore parameter of FIG. 9.

FIG. 10 shows some details of the save-restore parameter 82 of FIG. 9 that may further include a configuration bus address 84 for directing the configuration bus 42 of FIG. 1 to access the state device 40 regarding the operational state 32. The save-restore parameter 82 may further include a configuration bus transfer length 86 and/or a bus address increment 88. The configuration bus transfer length 86 may be used to indicate how many transfers on the configuration bus 42 will be needed to save and restore the latches 46 and/or the one or more tables 48 included in one of the state devices 40 as shown in FIG. 4. The bus address increment 88 may be used to skip over addresses that do not need to be saved and restored during low power mode.

Figure 11:
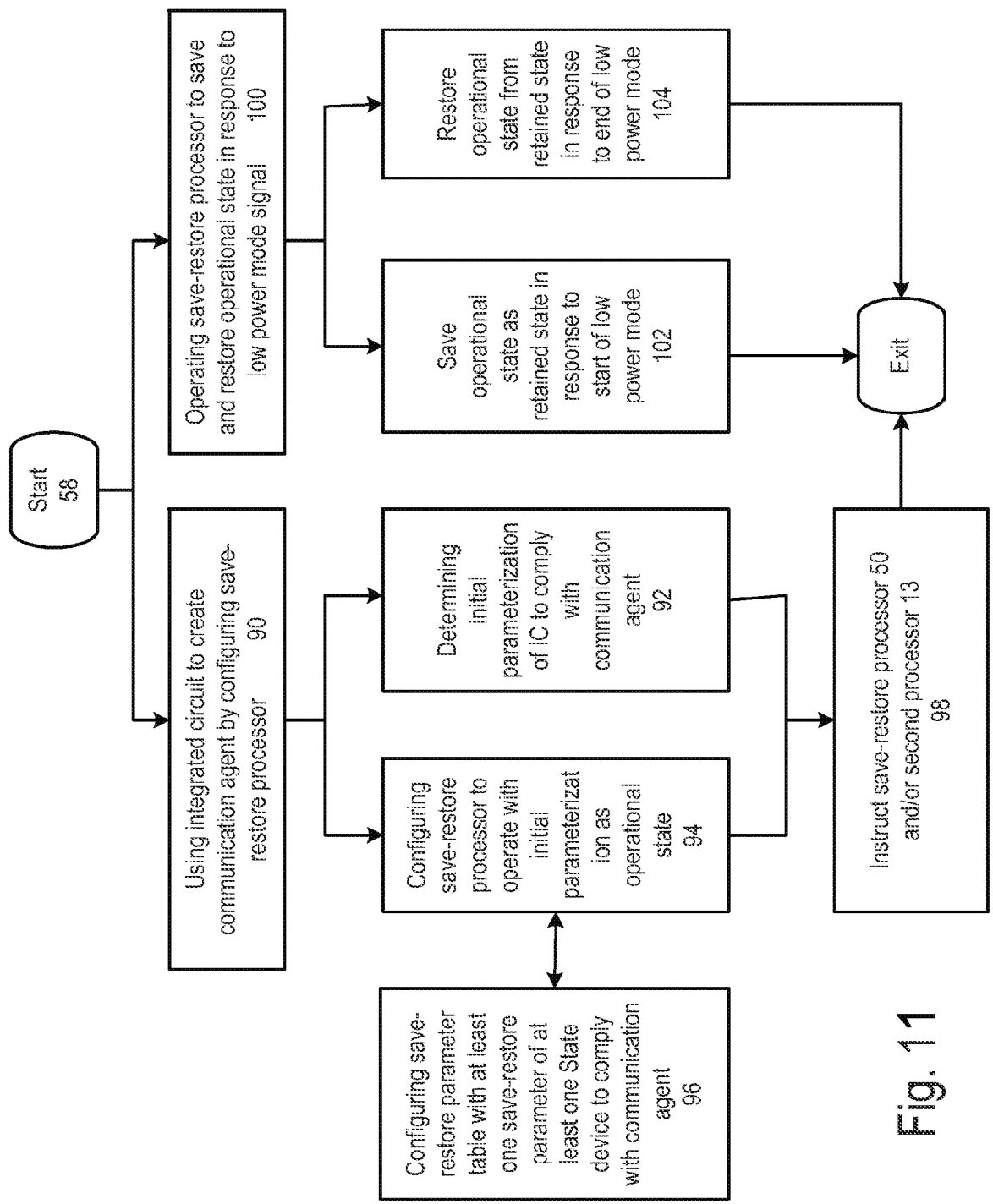
FIG. 11 shows a flowchart of some details of some examples of the program system of FIG. 9.

FIG. 11 show flowcharts of some details of the program system 58 instructing the save-restore processor 50. These flowcharts show some method embodiments, which may include arrows signifying a flow of control, and sometimes data, supporting various implementations. These may include a program operation, or program thread, executing upon the computer 54 or states of the finite state machine 52 and/or 53. Each of these program steps may at least partly support the operation to be performed. The operation of starting a flowchart refers to entering a subroutine or a macroinstruction sequence in the computer or of a possibly initial state or condition of the finite state machine. The operation of termination in a flowchart refers to completion of those operations, which may result in a subroutine return in the computer or possibly return the finite state machine to a previous condition or state. A rounded box with the word "Exit" in it denotes the operation of terminating a flowchart.

FIG. 11 shows a flowchart of the program system 58 including the program step 90, which supports using the integrated circuit 10 as the communication agent 70 of FIGS. 1 and 8, and program step 100, which supports operating the save-restore processor 50 to save and restore the operational state 32 in response to the start and the end of the low power mode 12 as indicated by the low power mode signal 11.

FIG. 11 also shows a flowchart of some details of the program step 90 using the integrated circuit 10 as the communication agent 70, including the following: Program step 92 supports determining an initial parameterization 59 of the integrated circuit 10 to comply with the specifications of the communication agent 70. Such specifications may include gain setting for one or more amplifiers, cut-off frequencies for one or more filters, logical channel allocations and/or establishing identifications of the communication agent, such as a client or host identification. And program step 94 supports configuring the save-restore processor 50 to operate with the initial parameterization 59 as the operational state 32. Either of the program steps 92 and/or 94 may instruct the save and restore processor 50 and/or the second processor 13 in various embodiments (step 98).

The program step 94 configuring the save-restore processor 50 may include the program step 96, which supports configuring the save-restore parameter table 80 with at least one save-restore parameter 82 of at least one state device 40 to comply with the communication agent 70.

FIG. 11 also shows some details of the program step 100 further operating the save and restore processor 50. Program step 102 supports the save and restore processor 50 saving the operational state 32 as the retained state 34 in response to the start of the low power mode. And program step 104 supports the save and restore processor 50 restoring the operational state 32 from the retained state 34 in response to the end of the low power mode.

These program steps 100, 102 and/or 104 may be implemented as operations of the save-restore processor 50 directing the configuration bus 42 and the essentially non-volatile memory 60 and may further be based upon the save-restore parameter table 80 and its save-restore parameters 82. These program steps 100, 102 and/or 104 may use the configuration bus address 84 to access the state device 40 via the configuration bus 42. The operational state 32 may require access to one or more latches 46 and/or access of one or more tables 48, any of which may entail use of the configuration bus transfer length 86 and/or use of the bus address increment 88.

Figure 12:
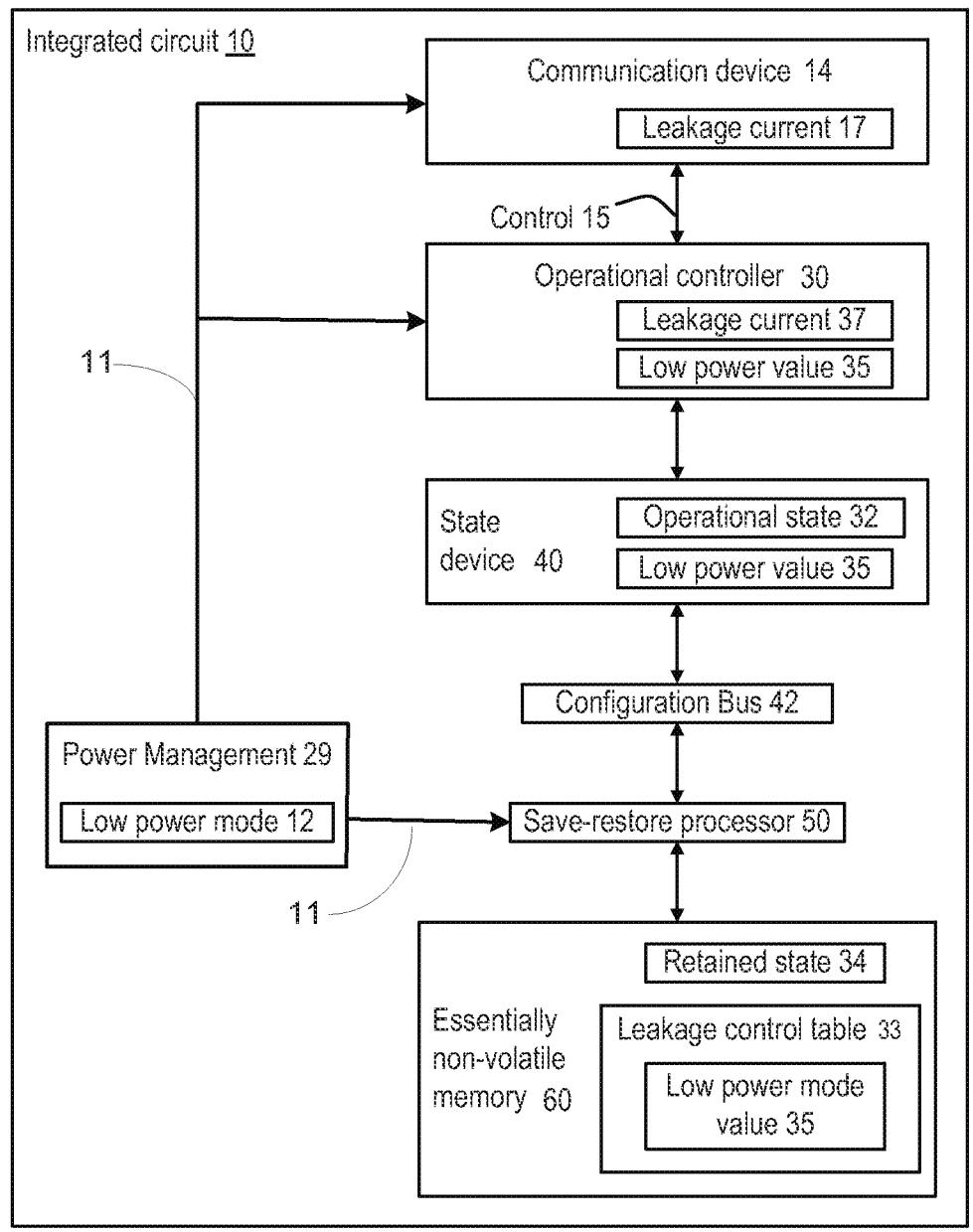
FIG. 12 shows an alternative embodiment of the integrated circuit built in accord with this disclosure.

FIG. 12 shows a refinement or alternative embodiment of the integrated circuit 10 of FIG. 1, where the save-restore processor 50 may also use a low power mode value 35 that it may send across the configuration bus 42 to the state device 40 to put the operational controller 30 into a condition that reduces its leakage current 37 during the low power mode 12. Determining the low power mode value 35 may use a list of primary circuit outputs and the net list of the circuit block. The circuit block may be include the operational controller 30 and/or part or all of the communication device 14, so that the low power mode value 35 may cause the communication device 14 to reduce a second leakage current 17 during the low power mode. The low power mode value 35 may be determined and then used by the save-restore processor 50 for at least one operational controller 30 during the assertion of the low power mode signal 11. A leakage control table 33 may be used and may include how to use the configuration bus 42 to communicate with these low power mode latches and/or tables and/or table entries in a fashion that may be similar to the above discussion regarding the save-restore parameter table 80 and/or the save-restore parameter 82, except that the leakage control table is used to set values at the start of low power mode, which is the opposite of saving the operational states 32. The leakage control table may further be included in a memory 56 of FIG. 9, a non-volatile memory 62 of FIG. 7 and/or a disk drive, which has not been shown.

The preceding embodiments provide examples and are not meant to constrain the scope of the following claims.

What is claimed is:

1. A device, comprising:
    a non-volatile memory;
    a state device configured to maintain operational states of the device; and
    a save-restore processor coupled to the state device and the non-volatile memory,
    wherein the save-restore processor is configured to:
        configure the state device with initialization parameters retrieved from the non-volatile memory when the device is turned on,
        retrieve an operational state of the state device before a start of a low power mode,
        store the retrieved operational state of the state device in the non-volatile memory,
        retrieve the operational state of the state device in the non-volatile memory at the end of the low power mode,
        restore the state device to the operational state at the end of the low power mode based, at least in part, on the retrieved operational state of the state device, and
        access a save-restore parameter table including at least one save-restore parameter for the state device, wherein the save-restore parameter includes a bus address increment parameter, wherein the bus address increment parameter indicates a bus address for the save-restore processor to bypass when storing or retrieving the operational state of the device.

2. The device of claim 1, wherein the state device includes one of the group consisting of a latch and a table.

3. The device of claim 1, further comprising an operational controller configured to control the device, wherein the operational controller includes a finite state machine whose state is based, at least in part, upon the operational state.

4. The device of claim 3, wherein the operational controller directs at least part of a communication module included in the device.

5. The device of claim 4, wherein the communication module implements at least part of a transceiver compliant with one of a wireless network protocol, a cellular phone protocol and a Bluetooth protocol.

6. The device of claim 1, wherein the non-volatile memory includes a memory configured to retain the retrieved operational state during the low power mode.

7. The device of claim 1, wherein the non-volatile memory includes a volatile memory configured to receive electrical power during the low power mode to retain the retrieved operational state during the low power mode.

8. The device of claim 1, wherein the save-restore processor includes a finite state machine.

9. The device of claim 1, wherein the save-restore parameter table further includes a configuration bus address for the state device.

10. The device of claim 1, wherein the save-restore parameter table further includes a configuration bus transfer length parameter.

11. The device of claim 10, wherein the bus address increment parameter indicates bus addresses to bypass by the save-restore processor.

12. A method, comprising:
    storing initial parameters for a state device in a non-volatile memory;
    configuring the state device with the initial parameters retrieved from the non-volatile memory when a device including the state device is turned on;
    retrieving an operational state of the state device before a start of a low power mode;
    storing the retrieved operational state of the state device in a save-restore parameter table of the non-volatile memory, wherein the save-restore parameter table comprises one of a configuration bus transfer length parameter and a bus address increment parameter;
    retrieving the operational state of the state device from the non-volatile memory at the end of the low power mode; and
    restoring the state device to the operational state based, at least in part, on the retrieved operational state of the state device.

13. The method of claim 12, further comprising controlling the device with an operational controller wherein the state of the operational controller is based, at least in part, on the state device.

14. The method of claim 12, wherein configuring the state device with the initial parameters further comprises configuring the state device to include operational states to configure a communication device.

15. The method of claim 14, wherein configuring the state device to the operational states to configure the communication device further comprises operational states to configure the communication device to use a transceiver compliant with at least one of a wireless network protocol, a cellular phone protocol and a Bluetooth protocol.

16. The method of claim 12, wherein the bus address increment parameter indicates bus addresses to bypass when storing or retrieving the operational state of the device.

17. A system for saving and restoring states of a communication device, the system comprising:
    a non-volatile memory;

a state device configured to maintain operational states of the communication device; and a save-restore processor coupled to the state device and the non-volatile memory, wherein the save-restore processor is configured to:

configure the state device with initialization parameters retrieved from the non-volatile memory when the communication device is turned on, retrieve an operational state of the state device before a start of a low power mode, store the retrieved operational state of the state device in the non-volatile memory, retrieve the operational state of the state device in the non-volatile memory at the end of the low power mode;

restore the state device to the operational state at the end of the low power mode based, at least in part, on the retrieved operational state of the state device, and access a save-restore parameter table including at least one save-restore parameter for the state device, wherein the save-restore parameter includes a bus address increment parameter, wherein the bus address increment parameter indicates a bus address to bypass by the save-restore processor when storing or retrieving the operational state of the device.

18. The system of claim 17, wherein the communication device is configured to use a transceiver compliant with at least one of a wireless network protocol, a cellular phone protocol and a Bluetooth protocol.

* * * * *